United States Patent
Krishnamurthy et al.

(10) Patent No.: US 7,698,442 B1
(45) Date of Patent: Apr. 13, 2010

(54) SERVER-BASED UNIVERSAL RESOURCE LOCATOR VERIFICATION SERVICE

(75) Inventors: Sathvik Krishnamurthy, San Jose, CA (US); Matthew J. Pauker, San Francisco, CA (US); Guido Appenzeller, Menlo Park, CA (US); Terence Spies, San Mateo, CA (US); David S. Thompson, San Francisco, CA (US); Lucas C. Ryan, San Francisco, CA (US)

(73) Assignee: Voltage Security, Inc., Palo Alto, CA (US)

( * ) Notice: Subject to any disclaimer, the term of this patent is extended or adjusted under 35 U.S.C. 154(b) by 1307 days.

(21) Appl. No.: 11/072,069

(22) Filed: Mar. 3, 2005

(51) Int. Cl.
*G06F 15/16* (2006.01)
*G06F 15/173* (2006.01)
*G06F 11/00* (2006.01)

(52) U.S. Cl. .................. 709/229; 709/203; 709/206; 709/226; 726/22

(58) Field of Classification Search ............... 709/203, 709/206, 226, 229; 726/22
See application file for complete search history.

(56) References Cited

U.S. PATENT DOCUMENTS

| | | | |
|---|---|---|---|
| 6,192,415 B1 * | 2/2001 | Haverstock et al. | 709/245 |
| 6,571,256 B1 * | 5/2003 | Dorian et al. | 707/104.1 |
| 6,725,259 B1 * | 4/2004 | Bharat | 709/219 |
| 7,028,029 B2 * | 4/2006 | Kamvar et al. | 707/5 |
| 7,051,368 B1 * | 5/2006 | Howard et al. | 726/23 |
| 7,072,944 B2 * | 7/2006 | Lalonde et al. | 709/206 |
| 7,114,177 B2 * | 9/2006 | Rosenberg et al. | 726/4 |
| 7,130,923 B2 | 10/2006 | Mason | |
| 7,167,985 B2 * | 1/2007 | Ahmed | 713/176 |
| 7,174,534 B2 * | 2/2007 | Chong et al. | 717/105 |
| 7,203,838 B1 * | 4/2007 | Glazer et al. | 713/176 |
| 7,216,361 B1 * | 5/2007 | Roskind et al. | 726/9 |
| 7,233,942 B2 * | 6/2007 | Nye | 707/3 |
| 7,313,691 B2 * | 12/2007 | Bantz et al. | 713/155 |
| 7,337,910 B2 * | 3/2008 | Cartmell et al. | 209/245 |
| 7,457,823 B2 * | 11/2008 | Shraim et al. | 707/104.1 |

(Continued)

OTHER PUBLICATIONS

"Internet Explorer Add-ons: toys and Tools" Sandi Hardmeier, Nov. 18, 2004 at http:www.microsoft.com/windows/ie/community/columns/browseraddons.mspx.*

(Continued)

*Primary Examiner*—Kevin Bates
(74) *Attorney, Agent, or Firm*—Treyz Law Group; G. Victor Treyz; David C. Kellogg

(57) ABSTRACT

A URL verification service is provided that is used to evaluate the trustworthiness of universal resource locators (URLs). As a user browses the world wide web, a URL verification client captures a URL associated with a web page of unknown authenticity. The URL verification client transmits the captured URL to a URL verification server. The URL verification server compares the URL to actively maintained whitelist and blacklist information. The server also uses the URL and a user-supplied or automatically-extracted brand to query a search engine. The URL verification server processes the response of the search engine to the search engine queries and the results of cache and whitelist and blacklist comparisons to determine whether the captured URL is legitimately associated with the brand. The results of the URL evaluation process are transmitted from the URL verification server to the URL verification client, which notifies user.

19 Claims, 11 Drawing Sheets

U.S. PATENT DOCUMENTS

| | | | |
|---|---|---|---|
| 2002/0099693 A1* | 7/2002 | Kofsky ........................... 707/3 |
| 2004/0030784 A1* | 2/2004 | Abdulhayoglu ............. 709/227 |
| 2004/0123157 A1 | 6/2004 | Alagna et al. |
| 2004/0193591 A1* | 9/2004 | Winter ........................... 707/3 |
| 2005/0108569 A1 | 5/2005 | Bantz et al. |
| 2005/0172229 A1* | 8/2005 | Reno et al. ................... 715/700 |
| 2005/0268100 A1* | 12/2005 | Gasparini et al. ........... 713/170 |
| 2006/0015722 A1* | 1/2006 | Rowan et al. ............... 713/166 |
| 2006/0021031 A1* | 1/2006 | Leahy et al. ................... 726/22 |
| 2006/0041508 A1* | 2/2006 | Pham et al. ................... 705/50 |
| 2006/0080735 A1* | 4/2006 | Brinson et al. ................ 726/22 |
| 2006/0095459 A1* | 5/2006 | Adelman et al. ............. 707/102 |
| 2006/0095955 A1* | 5/2006 | Vong .............................. 726/3 |
| 2006/0101120 A1* | 5/2006 | Helsper et al. .............. 709/206 |
| 2006/0106769 A1* | 5/2006 | Gibbs ............................ 707/3 |
| 2006/0106866 A1* | 5/2006 | Green et al. .............. 707/104.1 |
| 2006/0117055 A1* | 6/2006 | Doyle ......................... 707/102 |
| 2006/0212925 A1* | 9/2006 | Shull et al. ..................... 726/1 |
| 2007/0130327 A1* | 6/2007 | Kuo et al. .................... 709/224 |

OTHER PUBLICATIONS

U.S. Appl. No. 10/671,319, filed Sep. 24, 2003, Delany.
U.S. Appl. No. 10/805,181, filed Mar. 19, 2004, Delany.
Neil Chou et al. "Client-side defense against web-based identity theft", printed from internet at http://crypto.stanford.edu/SpoofGuard/webspoof.pdf.
Zoltan Gyongyi et al., "Combating Web Spam with TrustRank," Mar. 1, 2004. Printed from internet.

* cited by examiner

SERVER-BASED UNIVERSAL RESOURCE LOCATOR VERIFICATION SERVICE

BACKGROUND OF THE INVENTION

This invention relates to evaluating the trustworthiness of universal resource locators (URLs) such as those associated with web pages.

The world wide web is often used for sensitive transactions such as those involved in online banking and e-commerce. In a typical scenario, a user obtains access to an account at a financial institution by supplying a valid username and password.

The popularity of online services has given rise to fraud. One type of fraud, known as "phishing," involves sending fraudulent email messages to recipients to entice them to reveal their username and password or other sensitive information to an unauthorized party. Often the content of a fraudulent email is in html format and contains graphics and text that make the recipient believe that the fraudulent email was sent by a legitimate institution. For example, the fraudulent email may contain an accurate rendition of the logo of the recipient's bank.

The text of the fraudulent email may instruct the recipient to click on an embedded web link (URL). When the recipient clicks on the web link, the recipient's web browser presents the recipient with a fraudulent web page that appears to be associated with the recipient's institution. The fraudulent web page generally contains the institution's logo and other content that makes the web page difficult or impossible to distinguish from a legitimate web page associated with the institution. The fraudulent web page also contains text that prompts the recipient to log in to the institution by supplying appropriate credentials such as a username and password. When the recipient clicks on a login button on the fraudulent web page, the recipient's username and password are transmitted to the perpetrator of the fraud. The user credentials that have been fraudulently collected in this way may then be used to make unauthorized transactions at the recipient's institution.

It is therefore an object of the present invention to provide ways in which to help prevent fraud by verifying whether URLs are legitimate.

SUMMARY OF THE INVENTION

A URL verification service is provided that determines whether URLs that appear to be legitimate are authentic or are fraudulent.

As a user surfs the internet with a web browser, the user attempts to access a web page of interest using its universal resource locator (URL). The URL may appear to be legitimately associated with a brand. For example, the URL may contain the name that appears to be the name of the user's bank.

To determine whether the brand and the URL are legitimately associated or whether the URL is associated with a fraudulent web page in an attempt to trick the user, the URL verification service evaluates the trustworthiness of the URL and its association with the brand.

The trust verification service may have a URL verification client that operates on the user's computer. The URL verification client may be implemented as a web browser plugin (as an example).

As the user browses the web, the URL verification client captures a URL of unknown authenticity. The user may, for example, click on a web link in an email message believing that the web link is associated with the user's bank.

The user may supply the name of the bank (i.e., the brand that the user believes is legitimately associated with the URL) or the service may automatically extract the brand from the URL.

The captured URL and the user-supplied brand (if provided) are transmitted from the URL verification client to a URL verification server over the internet. The URL verification server uses a URL parsing and verification engine to evaluate the URL and its potential association with the brand.

In evaluating the trustworthiness of the URL, the URL parsing and verification engine may parse the URL into URL components including the web site address of the URL. The URL parsing and verification engine may consult the contents of a cache and the contents of an actively-maintained whitelist and an actively-maintained blacklist in determining whether the URL is trustworthy. The URL parsing and verification engine may also use the URL and brand to formulate queries for a search engine. The response of the search engine to the queries is processed by the URL parsing and verification engine to determine whether the brand is legitimately associated with the URL.

The results of the URL evaluation operations performed at the URL verification server are transmitted from the URL verification server to the URL verification client over the internet. The URL verification client receives the trust evaluation results and generates a message for the user. The message can be displayed in a browser bar format on the user's computer. The message may contain a warning that the URL could not be verified or may contain a message informing the user that the URL is trusted and is legitimately associated with the brand.

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to systems and methods for ascertaining whether universal resource locators (URLs) and the web pages and web sites associated with the URLs are legitimate or fraudulent.

URLs are typically associated with web pages and the invention is described in the context of web pages for clarity. In general, however, URLs may be used as links to any suitable resource. If a URL for a web page is determined to be fraudulent, the web page and web site associated with that URL are also fraudulent, so the URL verification process is sometimes referred to as a "web page" or "web site" authentication process.

In accordance with the present invention, URL authentication operations are performed by a server-based URL verification service. The URL verification service preferably uses a client-server architecture. A URL verification client running on a user's computer communicates with a remote URL verification server. As the user surfs the web, the URL verification client transmits information on the URLs that the user is attempting to access to the URL verification server. The URL verification server performs verification operations to determine the authenticity of the URLs and notifies the URL verification client of the results of the verification operations. The URL verification client informs the user of the results of the verification operations and takes other appropriate actions. Both manually-activated and automatically-activated URL verification operations may be performed by the URL verification service.

Figure 1:
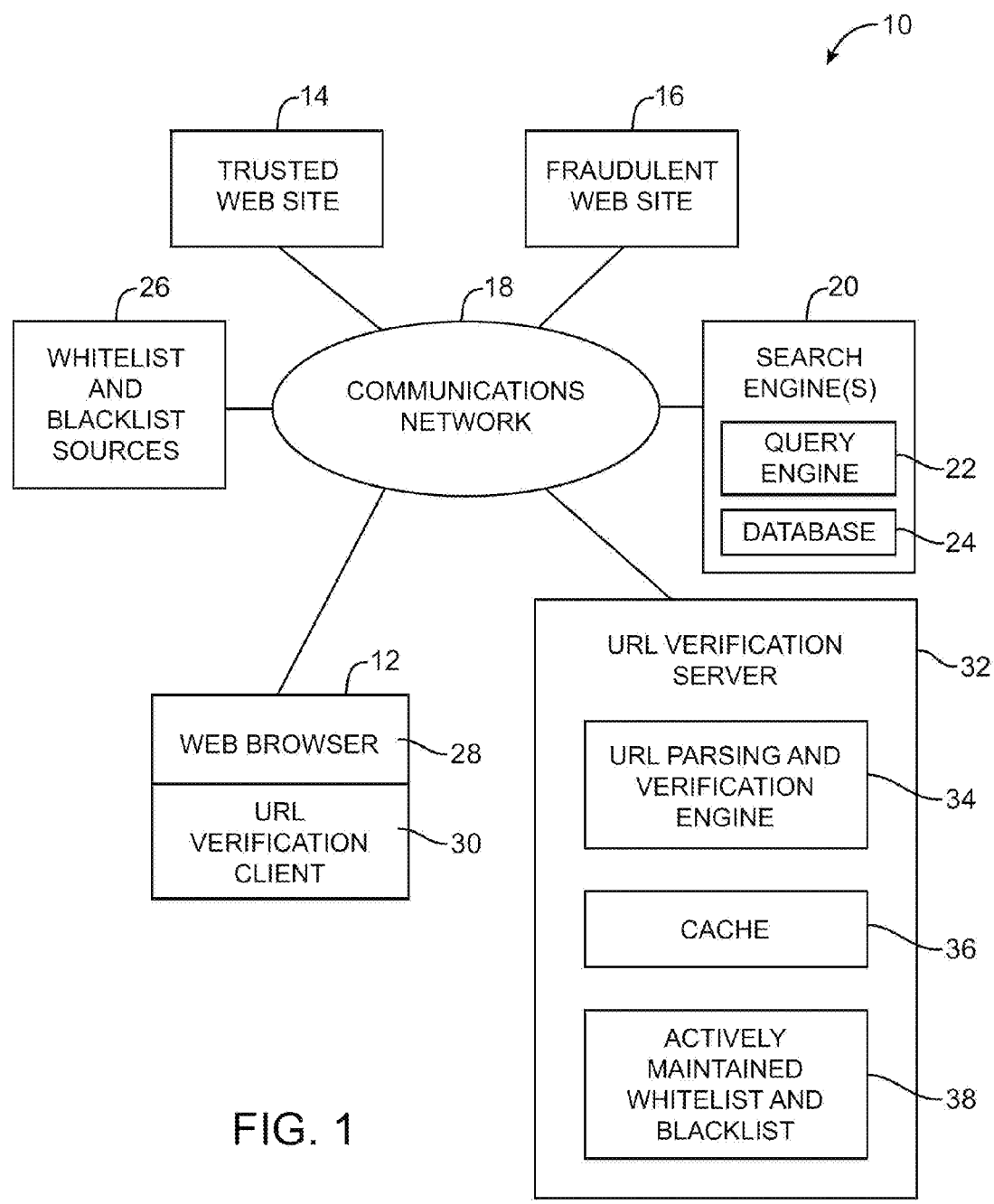
FIG. 1 is a diagram of an illustrative server-based web site verification system in accordance with the present invention.

An illustrative system environment in which a URL verification service may operate in accordance with the present invention is shown in FIG. 1. Users in system 10 have computing equipment 12. A web browser 28 and URL verification client 30 operate at equipment 12. The computing equipment 12 may be used to access trusted web sites 14 and fraudulent web sites 16 over communications network 18 (e.g., the internet).

One or more internet search engines 20 or other suitable database entities are used to provide information for evaluating URL authenticity. Each search engine 20 has a query engine 22 and a database 24. Search engine 20 uses query engine 22 to query database 24 in response to search requests and other requests made over communications network 18.

Entities such as the American Banking Association and other parties may serve as sources 26 of whitelists and blacklists. Whitelists contain information identifying trusted websites and associated entities. Blacklists contain information identifying fraudulent websites.

A URL verification server 32 uses URL parsing and verification engine 34 to perform URL verification operations in response to verification requests from URL verification clients 30. Server 32 interacts with search engine 20 in determining whether URLs are fraudulent. Server 32 can also consult a cache 36 and actively-maintained whitelist and blacklist information 38 from sources such as sources 26 in performing authentication operations.

Computing equipment 12 may be a personal computer, a workstation, a portable computing device such as a handheld computer, laptop, cellular telephone, or any other suitable computing device or network of such devices. The other entities in FIG. 1 such as sources 26, web sites 14 and 16, search engine 20, and URL verification server 32 may be provided using one or more servers or using any other suitable computing equipment arrangement. There may be a one-to-one correspondence between the entities and servers in system 10 or the entities of system 10 be provided using a distributed computing arrangement using multiple computers. For example, search engine 20 may be implemented using a cluster of servers. When multiple computers are used to support an entity's operations, the computers may be located at the same location or may be networked together using communications network 18. Network 18 may be any suitable wired and/or wireless network (e.g., the internet).

A user at computing equipment 12 uses a web browser 28 to surf the internet. There are generally numerous users in system 10, but only a single user is shown in FIG. 1 to avoid over-complicating the drawing.

The URL verification client 30 for the user at computing equipment 12 may be provided as a browser plugin, as an integrated portion of a web browser, as a stand-alone application, or using any other suitable arrangement. During web surfing, the URL verification client 30 and web browser 28 interact. The URL verification client 30 transmits information such as the URLs to which the user is browsing to URL verification server 32. The URL verification server 32 works with search engines 20 to evaluate the authenticity of the URLs. The URL verification server 32 then notifies the URL client 30 of the results of the authentication process, so that the URL client 30 can notify the user accordingly.

The URL verification server 32 may include a cache 36. Cache 36 may be implemented using memory and storage devices in the computing equipment on which server 32 is based. Information such as the results of URL verification operations may be stored in cache 36. During subsequent URL verification operations, the contents of cache 36 may be consulted to help determine whether a URL is authentic. Using cache 36 may reduce the computational burden that would otherwise be imposed on a system without cache capabilities and may therefore improve system performance.

In evaluating whether a web page's URL is associated with a trusted web site, the verification service may determine whether the URL has a valid top level domain. Information on which top level domains are valid may be stored as a list at server 32 (e.g., as part of lists 38 or in any other suitable database structures).

With the arrangement shown in FIG. 1, software for implementing the URL verification service may be implemented on user computing equipment 12 as a built-in browser component or as a browser plug-in (e.g., URL verification client 30) and on server 32 (e.g., URL parsing and verification engine 34). Search engine database query operations for supporting the URL verification service may be implemented using the database 24 and the database query engine 22 running at search engine 20. Any suitable number of search engines 20 may be included in system 10. When multiple search engines 20 are used, URL verification server 32 may aggregate query results from the search engines to improve performance and provide redundancy.

Trusted web sites that a user may visit may include financial institutions such as the user's bank. During a typical online banking transaction, the user enters username and password information into a web page (a web "form"). When the user clicks on a login button or other suitable on-screen option, the contents of the web form are uploaded to the user's bank at site 14. The user's bank authenticates the user by comparing the uploaded username and password information to account information stored at the bank. If the user's username and password match the bank's account records, the user is permitted to access the user's bank account. The user may then withdrawal and transfer funds and perform other financial transactions.

Effective security in this type of system is dependent on the user guarding the secrecy of the username and password information. If the user can be tricked into revealing the username and password information to an unauthorized party, the unauthorized party may obtain access to the user's bank account.

One type of attack that may be used to attempt to trick the user into revealing the sensitive information such as username and password credentials is the so-called phishing attack. With a phishing attack, an attacker attempts to trick a user into revealing the user's secret information by masquerading as a trusted entity such as the user's bank. For example, the attacker may send an email to the user that purports to be a security alert from the user's bank. The email may contain the bank's logo and text that instructs the user to click on a web link. When the user clicks on the web link, the user's browser takes the user to a fraudulent web site 16, which directs the user to upload the user's secret information for an apparently legitimate purpose. To help trick the user, the attacker may use a URL for site 16 that looks similar to the URL of trusted web site 14.

As an example, the user may have an account at ABCD Bank. The URL of the legitimate web site 14 associated with ABCD bank may be www.abcdbank.com. In order to effectively trick as many people as possible, the attacker may create a fraudulent web site 16 with a URL of www.abcdbank.com.pqrst.com, where pqrst.com in this example is the second level domain associated with the attacker's fraudulent web site 16. Because the fraudulent URL appears to be associated with ABCD Bank to a casual observer, the user may be misled into believing that the user is at the web site of ABCD Bank and may not realize that the user's browser has in fact taken the user to the web site 16 of the attacker. If the user subsequently follows the instructions provided by the fraudulent web site 16 (e.g., to provide the user's username and password information for an apparently legitimate purpose), the username and password information will be uploaded to the attacker at fraudulent web site 16. The attacker can then use this information to obtain unauthorized access to the user's account at ABCD bank.

To overcome phishing attacks and other social engineering attacks that attempt to trick the user into revealing secret information, the URL verification service of the present invention evaluates the authenticity of web page URLs and their associated web sites during user browsing sessions. If a user attempts to view a web page associated with a web site that is known to be untrusted, the user may be warned and the web page may be blocked or other appropriate action taken.

If the authenticity of the web site is not known, the URL of the web page is used to evaluate the web page's and site's authenticity. In evaluating whether a URL and the web site with which that URL is associated are to be trusted, the URL verification client 30 communicates with URL verification server 32 and the URL verification server 32 communicates with search engine 20. The data provided by search engine 20 is used by the URL verification engine 34 in determining whether the URL and web site are legitimate. The results of this determination are provided to URL verification client 30 over network 18.

One of the inputs provided to the search engine 20 by the URL verification engine 34 is the brand that is believed to be associated with the web site (e.g., the name of the bank or other organization that appears to own the web site). Brand information may be automatically extracted from the URL of the web page by the URL verification engine 34 or may be entered manually by the user at URL verification client 30 and transmitted to server 32 over network 18. If desired, client 30 may extract the brand for the URL and may transmit the extracted brand to server 32.

Once the URL verification engine 34 has obtained the proposed brand, (e.g., "ABCD Bank") the URL verification server 32 uses information on the web page's URL and the proposed brand as inputs to query the search engine 20. Using the information provided by the search engine 20 in response to these inputs, the URL verification engine 34 determines whether the URL is legitimately associated with the brand "ABCD Bank". The URL verification engine 34 may then notify the URL verification client 30 of the results of the URL evaluation process. The URL verification client 30 can inform the user of the results of the URL evaluation process by displaying a confirmation message indicating that the URL is legitimately associated with the brand or by displaying a warning that the URL cannot be verified.

The evaluation operations performed by URL verification engine 34 may be performed automatically and/or upon manual invocation by a user. If desired, the user may be provided with on-screen options by URL verification client 30 that allow the user to adjust whether or not automatic verification operations will be performed by the URL verification service. Any suitable user interface may be used to allow the user to make settings adjustments for the URL verification service. With one suitable arrangement, the user interacts with web browser options such as drop down menu options. When the user instructs the web browser appropriately, an overlay screen is displayed over the user's browser screen. The overlay region may contain a mode selection option. The user can click on an appropriate box in the overlay to place the URL verification service in either automatic or manual mode. As the user surfs the web, the user's browser 28 retrieves web pages from a variety of web sites. The URL verification service checks the validity of the URLs for these web pages automatically or upon manual invocation of the URL verification service, depending on whether the user has placed the service in automatic or manual mode.

Figure 2:
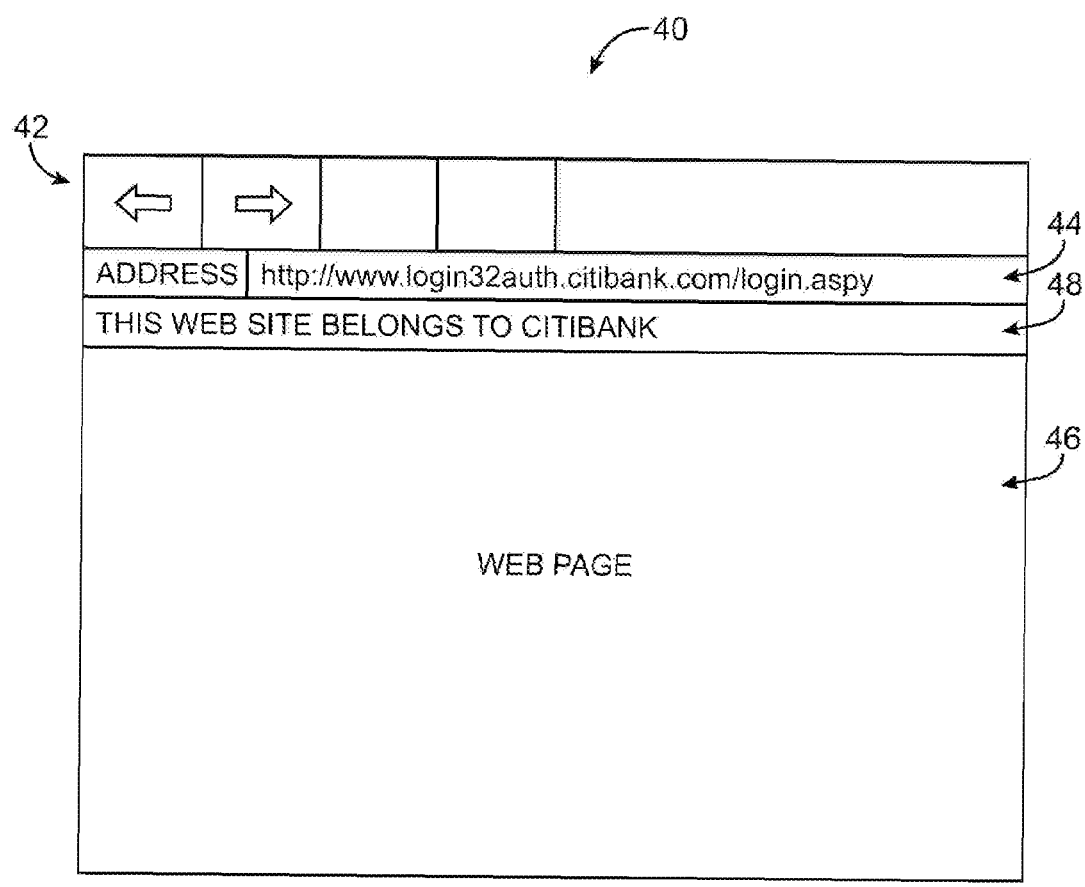
FIG. 2 shows an illustrative display screen that may be presented to a user when the user visits a web page that is legitimately associated with a trusted brand in accordance with the present invention.

When the URL verification service determines that a given web page is part of a valid web site, a screen such as screen 40 of FIG. 2 may be displayed for the user at computing equipment 12. Screen 40 contains web browser buttons 42. Region 44 is used to display the URL of the current web page. The corresponding web page is displayed in region 46 by the web browser 28. A confirmation message may be displayed by URL verification client 30 in region 48 to inform the user of the trusted status of the URL. The confirmation message may be, for example, a message generated by the URL verification client 30 that is displayed in a browser bar format as shown in FIG. 2. Valid status information may also be conveyed using icons or any other suitable format using any available portion of the display.

The message displayed in region 48 may contain information on the brand that the URL verification service has determined is legitimately associated with the URL in region 44. In the example of FIG. 2, the URL in region 44 was legitimately associated with the bank "Citibank," so the message in region 48 informs the user that the web page is part of a web site associated with Citibank. If the user does not recognize the brand listed in region 48 or has other concerns, the user can take appropriate corrective actions.

Figure 3:
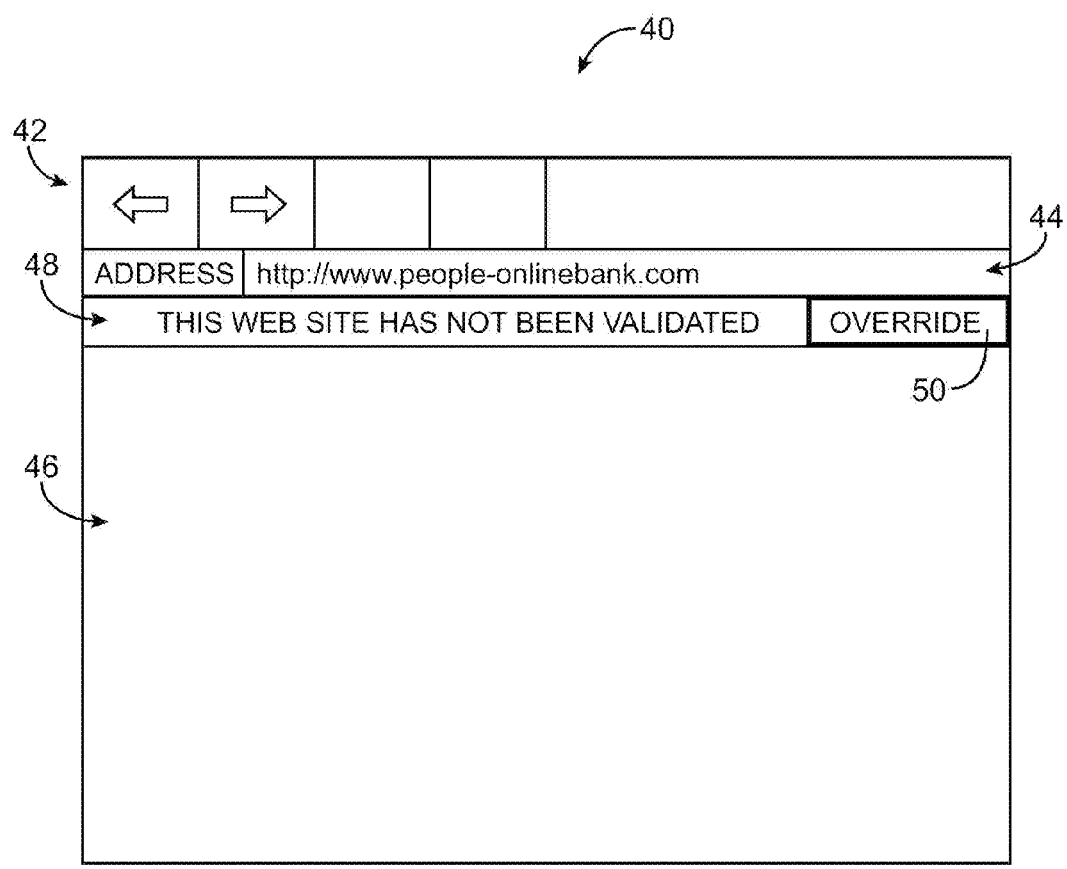
FIG. 3 shows an illustrative display screen that may be presented to a user when the user attempts to visit a web page that is not legitimately associated with a trusted brand in accordance with the present invention.

When the URL verification service determines that a given web page is from a fraudulent web site 16 or is suspicious, the user can be warned. As an example, a screen such as screen 40 of FIG. 3 may be displayed on the user's computing equipment 12 by browser 28 and client 30. In screen 40 of FIG. 3, web browser buttons are displayed in region 42. Region 44 contains the URL of the unverified web page. Because the URL verification service was unable to verify that the web page URL is authentic, a warning is being displayed in region 48. In addition to or instead of displaying the warning in region 48, a warning icon or other suitable indicator may be displayed to indicate that the URL in address region 44 is untrusted. In the example of FIG. 3, the web page corresponding to the URL of region 44 has been blocked and is therefore not being displayed in region 46. If desired, the untrusted web page could be displayed, particularly if sufficient warning is provided using warnings such as the warning of region 48.

Sometimes a user may desire to override the determination made by the URL verification service. For example, if a URL is associated with an obscure brand, the URL verification service may not be able to ascertain the URL's validity. Nevertheless, if the user believes that the URL is valid, the user can direct the URL verification service to add the URL and/or its associated web site to a list of trusted URLs/sites by clicking on an override button such as button 50. If the web page for the URL of region 44 was being blocked, clicking on the override button 50 will direct client 30 to allow the user's web browser 28 to display the web page in region 46.

As the user surfs the web, the URL verification client 30 can automatically capture the current URLs from browser 28 and can pass those URLs to URL verification server 32 over network 18 for evaluation. The URL verification server can automatically extract the proposed brand from the URL provided by the URL verification client. The user can also enter the proposed brand manually or client 30 can extract the brand from the captured URL.

Figure 4:
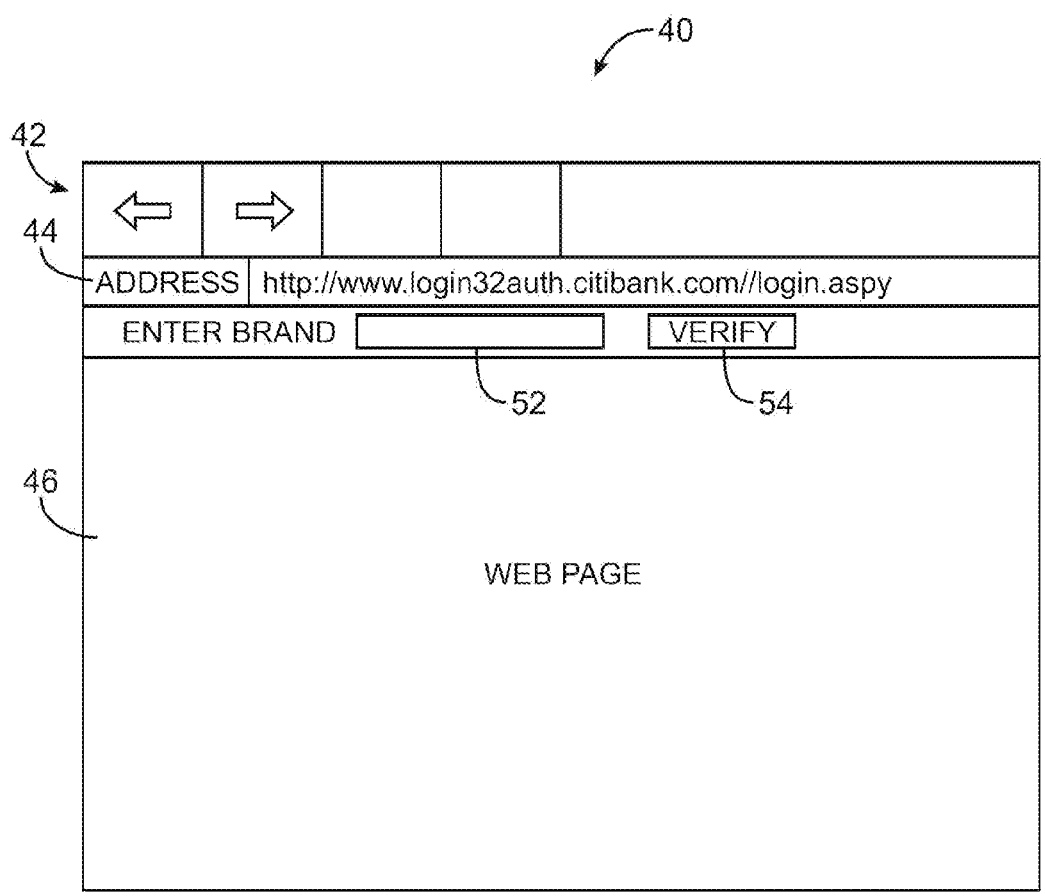
FIG. 4 shows an illustrative display screen that may be presented to a user to allow the user to supply a name for a brand that the user believes should be legitimately associated with a given URL in accordance with the present invention.

An illustrative screen 40 that may be displayed for a user on equipment 12 to allow the user to manually enter brand name information and to manually invoke verification operations is shown in FIG. 4.

In the illustrative screen 40 of FIG. 4, the current URL is shown in address region 44. If the user desires to evaluate the URL shown in region 44, the user types in the brand that the user believes is legitimately associated with the URL of region 44. For example, if the user believes the URL and/or the web page information displayed in region 46 appears to belong to Citibank, the user can enter the text string "Citibank" in region 52. After manually supplying the brand using text entry box 52, the user clicks on verify button 54. Selecting button 54 directs the URL verification client 30 to start the URL verification process. During this process, the URL verification client 30 submits the current URL and the manually-supplied brand from region 52 to the URL verification server.

Figure 5:
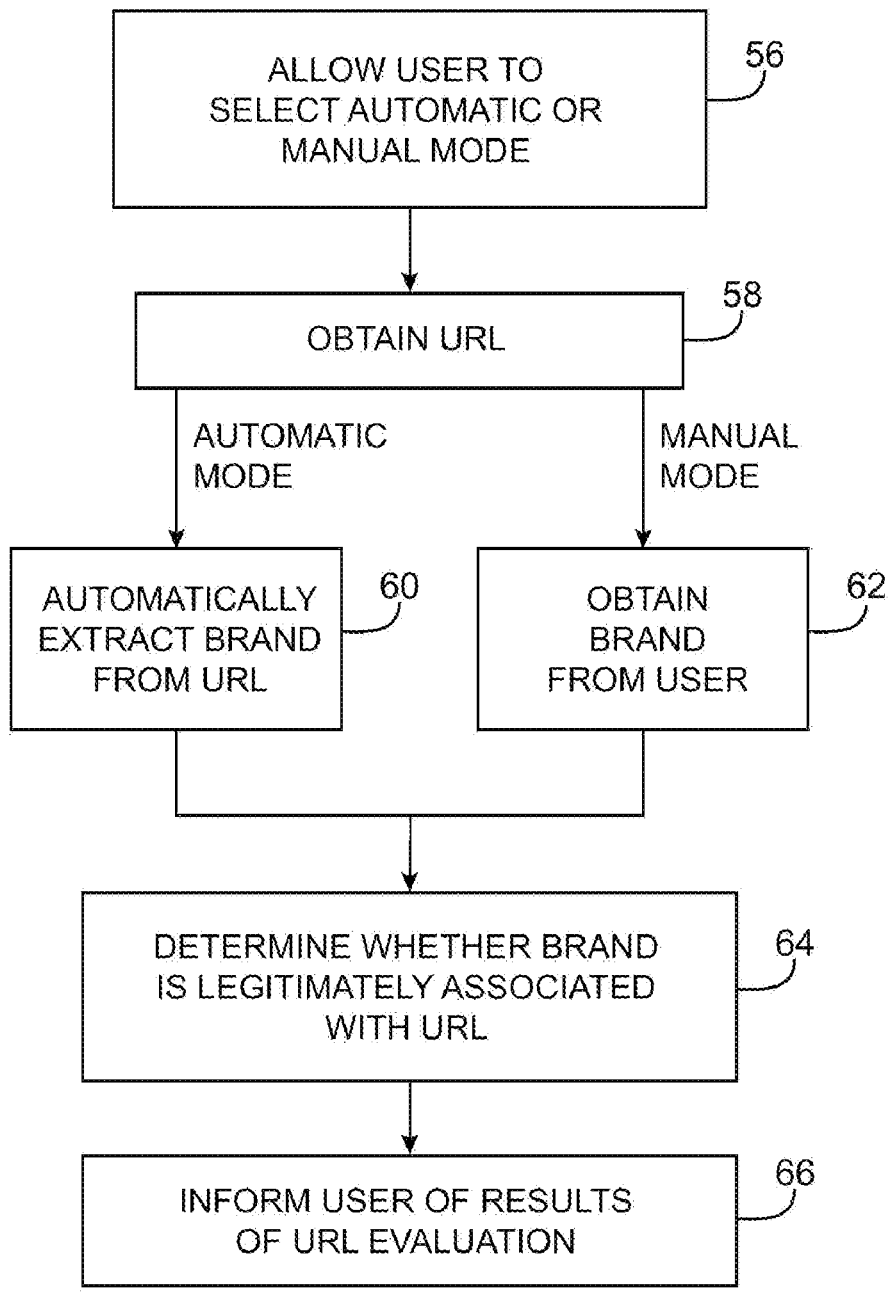
FIG. 5 is a flow chart of illustrative steps involved in using the web site verification service to evaluate whether URLs are legitimate in accordance with the present invention.

Illustrative steps involved in using the URL verification service of FIG. 1 are shown in FIG. 5.

At step 56, URL verification client 30 allows the user to select automatic or manual mode (e.g., by clicking on displayed on-screen options).

At step 58, as the user surfs the web with web browser 28, the URL verification client 30 obtains the URL of the user's current web page.

If the automatic mode has been selected, surfing to a web page will automatically cause the URL verification client 30 to submit the URL to URL verification server 32. In automatic mode, the brand can be automatically extracted from the URL. Brand extraction can be performed by URL verification server 32 using the URL provided by the URL verification client 30. Alternatively, URL verification client 30 can perform brand extraction at step 60 and can transmit the extracted brand to the URL verification server 32.

If the manual mode has been selected, the brand is obtained from user input at step 62. For example, URL verification client 30 can obtain the user-supplied brand using brand text entry box 52 of FIG. 4.

At step 64, the URL verification server 32 can use the URL and automatically-extracted or manually-supplied brand to evaluate the authenticity of the URL. The brand may be spell checked using a spell checker function associated with search engine 20 or using any other suitable spell checker or format checker arrangement. Spell checking and format checking may be performed as part of the brand entry or brand extraction process or may be performed as part of subsequent operations in which URL verification server 32 queries search engine 20.

During the evaluation of step 64, the URL verification server 32 may use URL verification engine 34 to prefilter the URL to determine if the URL has suspicious attributes such as containing only numbers or an @ form indirection. The URL verification server 32 also can use the contents of cache 36 and the contents of the actively maintained whitelist and actively maintained blacklist 38 in determining whether the URL is to be trusted. Some portions of the URL evaluation process involve using information from the URL and brand as inputs to search engine 20. The information provided from search engine 20 to URL verification server 32 in response is processed by URL verification engine 34 to determine whether the URL is legitimately associated with brand.

After the URL verification server 32 determines whether the brand is legitimately associated with the URL, the URL verification server 32 can instruct the URL verification client 30 to inform the user accordingly (step 66). The URL verification client 30 may, for example, generate and display status information in the form of a confirmation message such as the message of region 48 of FIG. 2 or in the form of a warning message such as the message of region 48 of FIG. 3.

To evaluate whether a given URL is legitimately associated with a brand, the URL is parsed into its constituent components (top level domain, second level domain, etc.). Web browser 28 contains a URL parsing engine that URL verification client 30 can use. URL verification server 32 can use URL parsing engine 34 to perform URL parsing operations.

Figure 6:
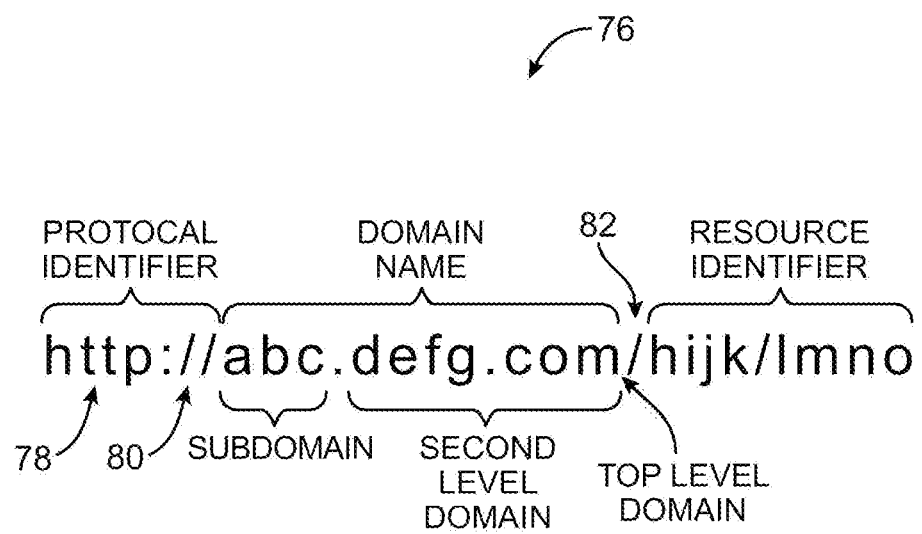
FIG. 6 is a diagram showing the components in a typical universal resource locator (URL).

The parts of a typical web page URL 76 are shown in FIG. 6. As shown in FIG. 6, the URL has an associated protocol identifier 78. Web pages are identified by the protocol identifier "http". The portion of the URL between double forward slashes 80 and the first single forward slash 82 corresponds to the URL's domain name portion. The domain name includes a top level domain such as .com, .gov, .org, etc. and a second level domain. The domain name may also include an optional subdomain portion. The second level domain is sometimes referred to as the web site address associated with the URL. Individual web pages at the site share the same second level domain, but are differentiated through the use of unique subdomains and/or resource identifiers.

The URL verification service of the present invention determines whether URLs (and their associated web pages and the web sites of which they are a part) are legitimately associated with a user-supplied or automatically-extracted brand name. The URL verification service may cache verification results for future use (e.g., using cache 36 and/or a local cache maintained by URL verification client 30).

Figure 7:
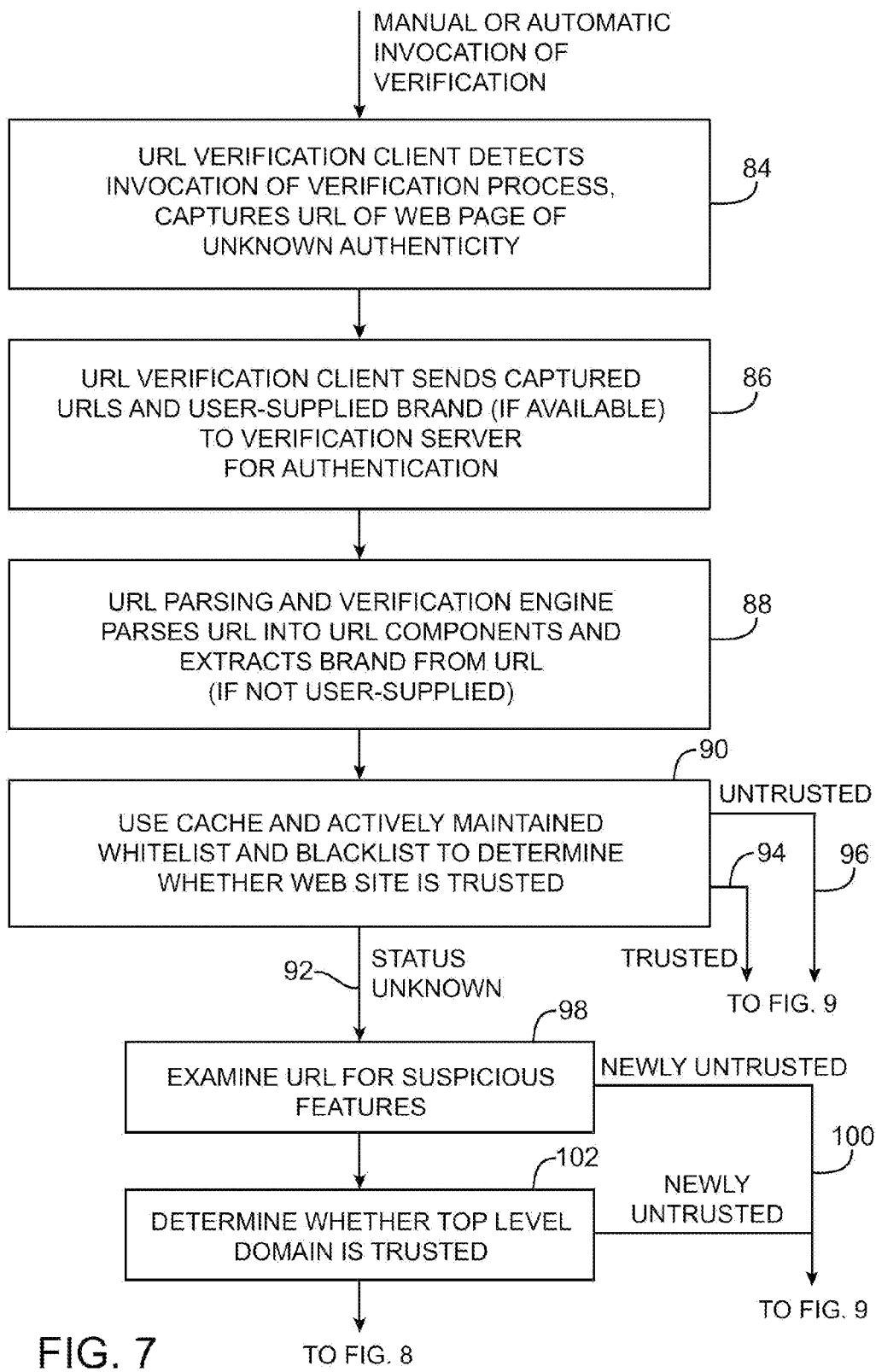
FIGS. 7, 8, and 9 contain a flow chart of illustrative steps involved in using a server-based URL verification service to automatically ascertain whether URLs are legitimate in accordance with the present invention.
Figure 8:
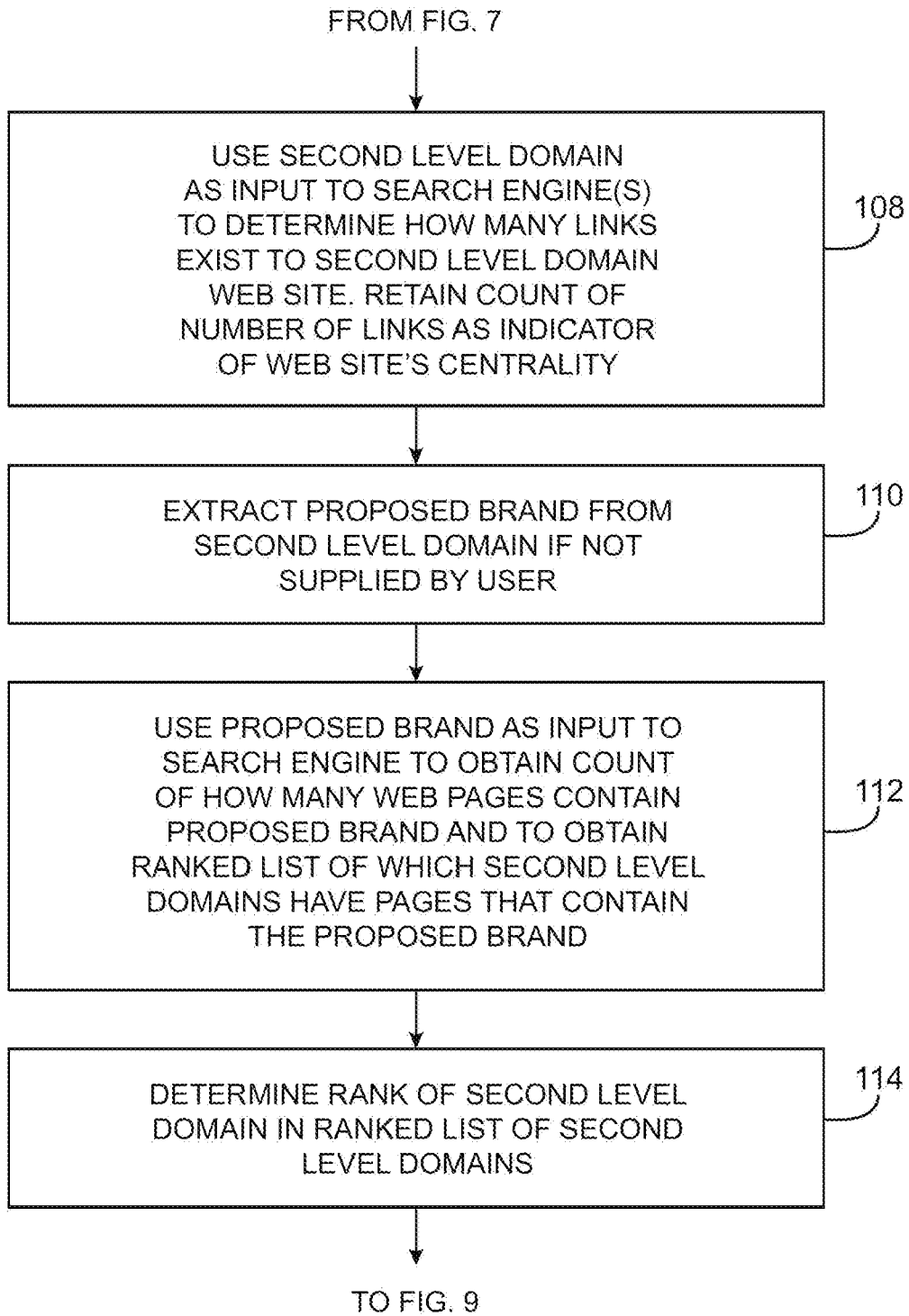
Figure 9:
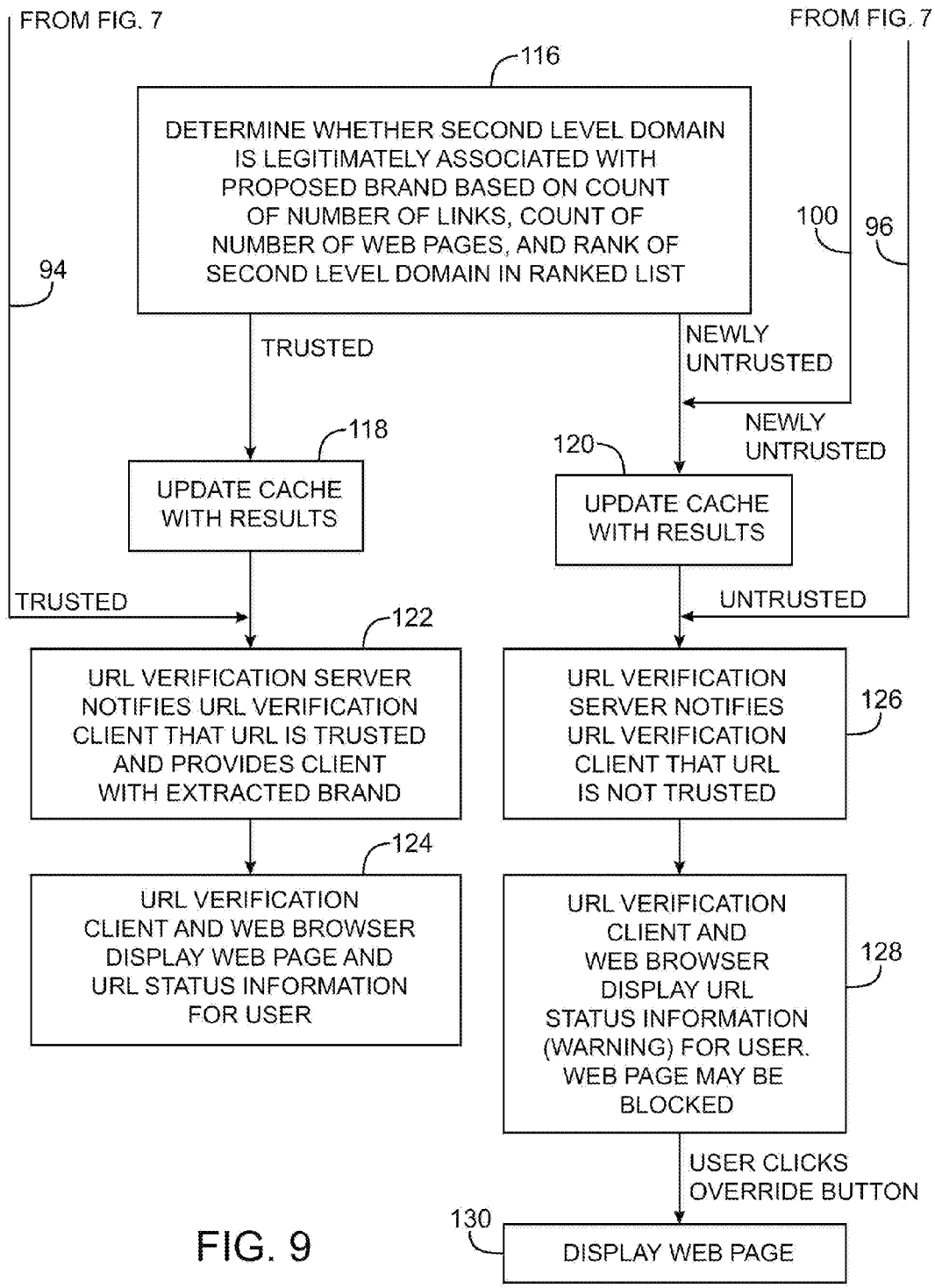

Illustrative steps involved in using the web site verification service are shown in the flow chart of FIGS. 7, 8, and 9.

At step 84, the URL verification client 30 detects manual or automatic invocation of URL verification operations and captures the current URL. In a manual scenario, a user may be provided with a text box or other on-screen option by client 30 that allows entry of a text string naming the brand (trusted entity) with which the user believes the current URL is associated and a corresponding button to start URL verification operations. If the user is visiting a web site that the user believes is associated with a particular bank, for example, the user can type the name of the bank into the text box and click on an associated "verify" option to commence verification operations. In an automatic scenario, the URL verification client 30 may automatically begin verification operations each time the user visits or requests access to a new web page with browser 28. During step 84, the URL verification client 30 obtains the URL of the web page that the user is accessing with web browser 28. The web page may be displayed while the URL verification service is performing verification operations or display of the web page may be suppressed pending a successful verification.

At step 86, the URL verification client 30 provides the captured URL to the URL verification server 32 over communications network 18. In manual mode, the URL verification client 30 also provides the user-supplied brand to the URL verification server 32. In automatic mode, the URL verification client 30 can locally extract the brand from the URL and provide the extracted brand to the URL verification server 32 or, as shown in the flow chart of FIGS. 7-9, the URL may be transmitted to server 32 by client 30 so that server 32 can perform brand extraction operations.

At step 88, URL verification server 32 uses the URL parsing engine 34 to parse the URL received from the URL verification client 30 into URL components. The URL components include a domain name (also known as the host name). As shown in FIG. 6, the domain name includes a top-level domain and a second-level domain and potentially includes one or more subdomains. The URL parsing engine 34 that is invoked by the URL verification server 32 may be, for example, a URL parsing engine compliant with RFC 2396 (Uniform Resource Locators) of the Internet Engineering Task Force (IETF). During step 88, the second-level domain may be extracted from the domain name. If not already supplied by the user or URL verification client 30 during step 86, the brand that appears to be associated with the URL may be automatically extracted from domain name during step 88. For example, engine 34 may extract the name "Citibank" from a URL containing the second level domain "citibank.com" by discarding the ".com" suffix (i.e., by discarding the top level domain portion of the second level domain).

Some brands contain two or more words (e.g., Wells Fargo). An incorrectly spelled or incorrectly formatted brand (e.g., wellsfargo) can be converted into a correctly spelled and formatted brand (e.g., Wells Fargo) using any suitable technique. For example, a spell checker function associated with search engine 20 may be used to identify the correct spelling and format for a brand. The correct spelling and format for the brand may be used, for example, when the URL verification server 32 provides the extracted brand to the URL verification client 30 to display for the user. The correct spelling and format for the brand may also be used when using query engine 22 to query database 24 during the process of evaluating the authenticity of the URL.

At step 90, the URL verification server 32 uses the cache 36 and the actively maintained whitelist and backlist 38 to determine whether the web site is trusted. The cache 36 may contain the results of previous verification operations. The whitelist may be a list of URLs and/or domain names, or other URL components that identify trusted web pages, web sites, and the entities associated with these sites. The whitelist may include, as an example, the second level domains for all known legitimate banks and the brand names of those banks, as published by a trusted whitelist source 26 such as the American Banking Association. The blacklist may include, as an example, a list of second level domains associated with fraudulent websites. The blacklist may contain information from a security service or other party that maintains information on the operators of fraudulent web sites 16. The whitelist and blacklist 38 are preferably actively maintained (e.g., by an administrator at server 32 that uses tools at server 32 to add, delete, and edit whitelist and blacklist entries).

In using cache and the whitelist and blacklist information to determine whether or not a URL is trusted, all or a portion of the URL may be compared to the cache, the whitelist, and the blacklist. In one suitable arrangement, the URL verification engine 34 maintains a local database in cache 36 that contains mappings between second level domain names (e.g., wellsfargo.com) and corresponding brands (e.g., Wells Fargo), and maintains a list of untrusted sites (h4x0rsRUs.com).

The URL parsing and verification engine 34 can compare the second level domain from the URL to second level domain information listed in the cache, the whitelist, and the blacklist. Engine 34 can also use the brand name during the operations of step 90. For example, if the engine 34 determines that the second level domain from the URL appears on a whitelist and the user-supplied or automatically-extracted brand from the URL matches the trusted brand listed in the whitelist, the engine 34 can conclude that the URL is trusted. If the second level domain or other portion of the URL appears on the blacklist, the engine 34 can conclude that the URL is not trusted. The results of previous URL evaluations may be stored in cache 36 in a list ordered by second level domains (as an example). By comparing the second level domain from the URL and the manually-supplied or automatically-extracted brand to the second level domain and brand information in the cache 36, engine 34 can determine whether previous results indicate that the URL is trusted or untrusted.

By consulting the cache 36 and lists 38, the URL verification engine 34 can potentially bypass further verification operations. If the operations of step 90 indicate that the URL is trusted, subsequent verification operations can be bypassed, as shown by line 94. If the operations of step 90 indicate that the URL is untrusted, subsequent verification operations can be bypassed as shown by line 96.

If the URL verification engine 34 is unable to determine the status of the URL at step 90 based on the contents of the cache 36 and lists 38, the status of the URL is unknown (line 92). Accordingly, at step 98, the URL verification engine 34 prefilters the URL. In particular, the URL verification engine 34 examines the URL for features that are known to be suspicious and not normally associated with legitimate commercial sites.

Any suitable URL characteristics may be considered when using the URL verification engine 34 to determine whether the URL is suspicious during the prefiltering operations of step 98. As an example, use of a numeric form URL or a URL containing an @ form indirection may be considered untrustworthy. An illustrative numeric form URL is http://145.67.42.1/login.aspx. An illustrative URL containing an @ form indirection is http://www.bank.com/login.aspx@phisher.com. In this type of URL, the actual web site to which the user is directed is phisher.com, rather than bank.com. Numeric form URLs and URLs with @ form indirections are typically only used in development projects or while sites are under construction. In these situations, sophisticated users can ignore or override warnings provided by the URL verification engine 34.

If the prefiltering operations of step 98 reveal that the URL is untrusted, step 102 may be bypassed, as shown by line 100. Under typical conditions, the prefiltering operations of step 98 detect about 60% of the phish attacks archived at antiphishing.org.

If the prefiltering operations of step 98 do not classify the URL as being untrusted, processing continues at step 102. During step 102, the URL verification engine 34 determines whether the top level domain of the URL is trusted. In performing this operation, the URL verification engine 26 may consult the list of valid top level domains (e.g., a list stored at URL verification server 32). The list used to validate the top level domains may be the list of valid top level domains published by the Internet Assigned Numbers Authority (IANA) or may be based on an IANA list.

If the top level domain of the URL does not appear in the list of valid top level domains, the URL verification engine 34 can conclude that the URL is untrusted and can bypass further verification operations, as shown by line 100.

Otherwise, at step 108 of FIG. 8, the URL verification engine 34 uses the second level domain from the domain name as an input to the search engine 20. In particular, the URL verification engine 34 formulates a database query for search engine 20 that uses the second level domain. The query asks the search engine 20 to use query engine 22 to query database 24 to determine how many web links exist to the second level domain (i.e., to the web site defined by the second level domain). The count of the number of links to the second level domain is used by the URL verification engine as an indicator of centrality, i.e., the degree to which other web sites and pages link to the web site associated with the URL of unknown authenticity.

Any suitable database 24 and query engine 22 may be used at search engine 20 to support the operations of step 108. For example, the search engine 20 may take into account the centrality of the linking sites in determining the centrality of the second level domain. With this type of approach, links from blogs and untrustworthy machines are not included in the link count and will therefore not undesirably skew the measure of centrality. Because attackers generally construct their fraudulent sites 16 so that they will go unnoticed and be difficult to locate and shut down, the URL verification engine 34 preferably requires a sufficient level of centrality for a site to be considered trustworthy.

At step 110, the URL verification engine 34 extracts a proposed brand from the second level domain if an automatically-extracted brand or user-supplied brand has not already been transmitted to the URL verification server from the URL verification client 30 at step 86 and if the URL parsing and verification engine has not already extracted the brand from the URL at step 88 to use in querying the cache 36 and lists 38. The proposed brand is the brand that should be legitimately associated with the URL of the web page that the user is interested in visiting.

The proposed brand is generally a brand name that is embedded in the second level domain. For example, if the second level domain is citibank.com, the URL verification engine 34 will extract the proposed brand "Citibank" by discarding the top level domain portion ".com" from the second level domain. Some second level domain formats require that additional information be stripped when extracting the proposed brand during steps such as steps 88 and 110. For example, a web site in the United Kingdom that is associated with the United Kingdom branch of Barclays bank may have a second level domain of "barclays.co.uk". In this type of situation, both the top level domain ".uk" and the company suffix ".co" are stripped from the second level domain by the URL verification engine 34. Brand extraction operations such as this may supported by including supplemental information in a valid top level domain name list maintained at server 32. URL verification engine 34 can use this supplemental information in extracting the proposed brand.

A step 112, the URL verification engine 34 uses the proposed brand as an input to search engine 20 (step 112). During step 112, the URL verification engine 34 queries the search engine using the proposed brand as an query term (input) for use by query engine 22 in querying database 24. The query made to the search engine 20 directs the search engine 20 to return a count of how many web pages contain the proposed brand (e.g., the text string "Citibank") and directs the search engine 20 to produce a ranked list of which second level domains have pages that contain the proposed brand. An example of a search engine that supports the queries of steps 108 and 112 is the Google internet search engine of Google, Inc. The queries of steps 108 and 112 may be made as one or more individual queries or as part of a single query operation.

The query operations of step 112 direct the search engine 20 to return a count of the number of web pages that contain the proposed brand (i.e., the number of page "hits"). The page hit count is representative of the popularity of the proposed brand as a search term. Legitimate brands are likely to have high hit counts, so the hit count is a good indicator of legitimacy. As with the centrality metric associated with the query of step 108, the hit count metric will be high for legitimate sites. An attacker can only attempt to circumvent the hit count metric by creating a fraudulent web site using a popular search term in its domain name, which runs counter to the attacker's desire to maintain a low profile.

The queries of step 112 also direct the search engine 20 to provide the URL verification engine 34 with a ranked list indicating, in order of popularity, the second level domains that have web pages including the proposed brand. The ranked list shows which web sites (second level domains) are most associated with the proposed brand. Any suitable number of entries may be returned in the ranked list. For example, the ranked list may include the top 5 or top 10 web sites containing the proposed brand.

At step 114, the URL verification engine 4 determines the rank of the second level domain within the ranked list of second level domains. During step 114, the URL verification engine 34 compares the second level domain from the URL to the second level domains in the list to determine the placement of the second level domain from the URL within the list (e.g., at the top of the list, second from the top, in the top 5, in the top 10, etc.).

A high ranking in the list indicates that the web site (second level domain) associated with the URL is an "authoritative" site for the proposed brand. For example, it is likely that the official web site for a bank would be among the most highly ranked sites containing the bank's name. In this situation, the rank of the bank's web site in the ranked list might be number one or number two. If desired, search engine 20 may determine the rank of the second level domain within the ranked list and may provide the rank to the URL verification engine 34 rather than the ranked list. When this type of arrangement is used, step 114 is performed at search engine 20 and the rank information is provided to URL verification engine 34 over communications network 18.

At step 116 of FIG. 9, the URL verification engine 34 determines whether the second level domain from the URL is legitimately associated with the brand. In making this determination, the URL verification engine 34 may use the count of the number of links that was obtained at step 108, the count of the number of page matches that was obtained at step 112, and the rank of the second level domain in the ranked list from steps 112 and 114.

With one suitable approach, a Boolean trust index, TI is calculated at step 116 using equation 1.

$$TI=(LC>1000)\,AND\,(PMC>10{,}000)\,AND\,(RANK<6) \qquad (1)$$

In equation 1, the variable LC represents the link count (i.e., the number of links to the web site corresponding to the URL). The variable PMC represents the page count (i.e., the number of page hits containing the proposed brand). The variable RANK represents the rank of the second level domain within the ranked list of second level domains.

The trust index formula of equation 1 uses Boolean logic. If the link count LC is above a user-specified or default link count threshold (1000 in this example), the first term in equation 1 is 1, otherwise the first term in equation 1 is 0. If the page match count PMC is greater than a user-specified or default page match count threshold (10,000 in this example) the second term is 1, otherwise the second term is 0. If the variable RANK is less than a user-specified or default rank threshold (6 in this example), the third term in equation 1 is 1, otherwise the third term is 0. The trust index TI will be 0 unless all three terms are 1. A trust index value of 0 indicates that the URL is not trusted. A trust index value of 1 indicates that the URL is trusted.

The trust index formula of equation 1 is merely illustrative. Any suitable equation may be used to determine whether or not to trust the URL. As an example, the link count, page match count, and rank variables may be summed after applying weighting factors. The resulting sum may be compared to a trust index threshold value to determine whether or not the URL is trusted. If desired, the trust index threshold value may be transmitted from server 32 to client 30 and displayed for the user. Additional factors may also be combined with the link count, page match count, and rank variables and/or a subset of one or more of the link count, page match count, and rank variables may be used when performing trust index calculations.

If, during step 116, it is determined that the URL is trusted, the URL verification engine 34 can update the cache 36 at step 118 accordingly. At step 122, the URL verification server 32 notifies the URL verification client 30 over network 18 of the results of the evaluation (i.e., that the URL is trusted). The brand that was extracted from the URL at step 88 (or step 110) is also transmitted over network 18 from server 32 to client 30. At step 124, the URL verification client 30 and web browser 28 are used to generate and display information to the user at equipment 12 that informs the user of the positive outcome of the URL verification operations. For example, a screen such as screen 40 of FIG. 2 may be displayed in which region 48 contains a message indicating that the URL is trusted. The message displayed in region 48 may include the brand obtained from the URL verification server 32.

As shown by line 94 of FIGS. 7 and 9, if it was determined at step 90 of FIG. 7 that the URL is to be trusted (i.e., by examining the cache 36 and lists 38), the intermediate steps of FIGS. 7-9 may be bypassed, and operations can proceed directly from step 90 of FIG. 7 to step 122 of FIG. 9. At step 122, server 32 can notify client 30 of the results of the operations of step 90, so that the user can be provided with appropriate status information at step 124.

If, during step 116 of FIG. 9, it is determined that the URL is not trusted, the URL verification engine 34 can update cache 36 accordingly at step 120. The URL verification server may then notify the URL verification client 30 over network 18 at step 126.

At step 128, after the URL verification client 30 has received a notification from the URL verification server 32 indicating that the URL is not trusted, the URL verification client 30 and web browser 28 may generate and display a warning for the user at equipment 12 and may, if desired, block access to the web page corresponding to the URL. The warning that is displayed may appear, for example, in region 48 of screen 40, as shown in FIG. 3. The user can click on override button 50 of FIG. 3 to override the URL verification service. When the user clicks on the override button 50, the URL verification client 30 may instruct the web browser 28 to display the web page corresponding to the URL (if it was previously blocked) at step 130. If desired, the user's override decision may be stored by client 30 and/or server 32, so that the web page for the URL will not be unnecessarily blocked in the future.

As shown by line 96 of FIGS. 7 and 9, if it was determined at step 90 of FIG. 7 that the URL is untrusted (i.e., by examining the cache 36 and lists 38), the intermediate steps of FIGS. 7-9 may be bypassed, and operations can proceed directly from step 90 of FIG. 7 to step 126 of FIG. 9. At step 126, server 32 can notify client 30 of the negative results of the operations of step 90, so that the user can be provided with appropriate status information at step 128.

As shown by line 100 of FIGS. 7 and 9, if it was determined at step 98 or step 102 of FIG. 7 that the URL is untrusted (i.e., because the URL did not have a valid top level domain or contained other suspicious features), the intermediate steps of FIGS. 7-9 may be bypassed, and operations can proceed directly from step 98 or 100 of FIG. 7 to cache update step 120. At step 120, the cache 36 is updated by URL verification engine 34 to reflect that the URL is not trusted. The server 32 can then inform the client 30 at step 126 that the URL is not trusted, so that the client can take appropriate actions at step 128.

If desired, the URL verification client 30 may extract the proposed brand from the URL of unknown authenticity and may transmit the extracted brand to the URL verification server 32, rather than using the URL verification server 32 to extract the brand from the URL at step 88 of FIG. 7 and/or step 110 of FIG. 8. Illustrative URL verification operations performed by the URL verification service 10 in an environment in which the brand is extracted from the URL by the URL verification client 30 are shown in FIG. 10.

Figure 10:
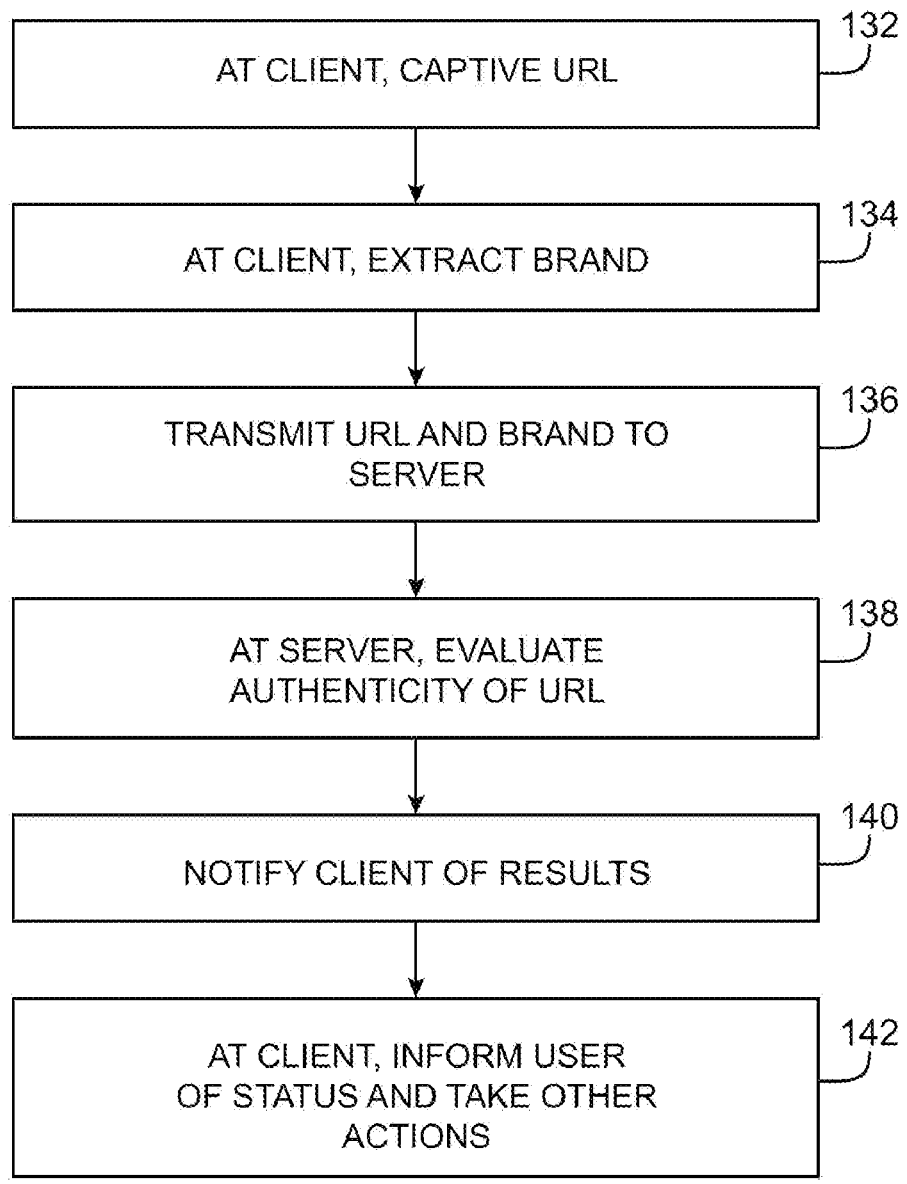
FIG. 10 is a flow chart of illustrative steps involved in verifying a URL in an environment in which a proposed brand is extracted from the URL at a URL verification client in accordance with the present invention.

At step 132 of FIG. 10, while the user is browsing the web using web browser 28, the URL verification client 30 captures a URL of unknown authenticity.

At step 134, the URL verification client 30 extracts the proposed brand from the URL. The client 30 may use a URL parsing engine to parse the URL into URL components including the second-level domain of the URL. The client 30 may then discard the top level domain (and suffix information if applicable) to extract the proposed brand. These operations may occur automatically, without manual user input.

At step 136, the URL that has been captured and the brand that the client 30 has extracted from the URL may be transmitted to the URL verification server 32 over communications network 18.

At step 138, the URL verification server 32 evaluates the authenticity of the URL, as described in connection with FIGS. 7, 8, and 9.

The URL verification server 32 notifies the URL verification client 30 of the results of the URL evaluation process over network 18 at step 140.

At step 142, the URL verification client 30 notifies the user of the results of the URL verification process and takes other suitable actions (e.g., blocking or unblocking the display of web pages, etc.). Information on the status of the URL evaluation may be displayed using any suitable format. For example, if the URL is determined to be trusted, the URL verification client 30 can generate and display a confirmation message such as the message in region 48 of FIG. 2. If the URL is determined to be untrusted, the URL verification client 30 may generate and display a warning message such as the message of region 48 of FIG. 3.

Figure 11:
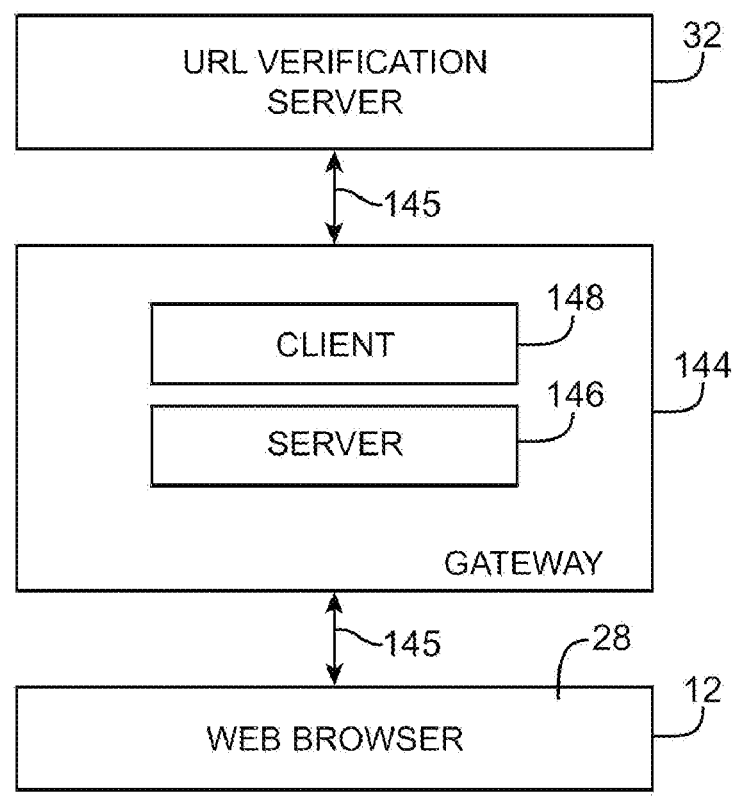
FIG. 11 is a diagram showing how a gateway may be used in a server-based URL verification service in accordance with the present invention.

In some environments it may be desirable to include a gateway in the system. A diagram of an illustrative system arrangement in which a gateway is used is shown in FIG. 11. As shown in FIG. 11, gateway 144 may be interposed between a user at user computing equipment 12 and URL verification server 32. Gateway 144 may be implemented using a computer or network of computers associated with an internet service provider, or other suitable entity. User computer 12, gateway 144, and server 32 may be connected through the internet or other suitable communications paths 145.

The user at equipment 12 uses web browser 28 to interact with a server 146 implemented on gateway 144. The server 146 interacts with a client 148 at gateway 144. The client 148 serves as a client to URL verification server 32 and, in this capacity, performs the operations of URL verification client 30 of FIG. 1. For example, client 148 can be used to capture a URL of unknown authenticity by determining which URL the user is accessing through gateway 144 with browser 28. Client 148 can transmit the captured URL (and optionally an extracted brand) to server 32 for verification, and receive verification results from server 32.

After obtaining the verification results from server 32, client 148 can provide these results to server 146. Server 146 acts as a server for web browser 28, which acts as a client. With this type of arrangement, server 146 may, for example, create web pages for browser 28. One part of the web page produced by server 146 may correspond to the web content associated with the captured URL. The other part of the web page may include status information provided by server 32 via client 148. The status information may include a warning message or confirmation message for the user that informs the user whether the URL is untrusted or trusted.

The arrangements of FIGS. 1 and 11 are not mutually exclusive. For example, some users may install URL verification clients 30 on their computers, whereas other users may use the verification service by virtue of the installation of client 148 and server 146 at a gateway 144 with which they are associated.

The foregoing is merely illustrative of the principles of this invention and various modifications can be made by those skilled in the art without departing from the scope and spirit of the invention.

What is claimed is:

1. A computer-implemented method for determining whether or not certain web page universal resource locators (URLs) are associated with trusted or fraudulent web sites, wherein a user browses to a plurality of web pages on the world wide web of unknown authenticity using computing equipment, wherein at least some of the web pages to which the user browses are associated with trusted web sites, and wherein at least some of the web pages to which the user browses are associated with fraudulent web sites, the method comprising:

as the user browses the world wide web using the computing equipment, obtaining URLs for the web pages of unknown authenticity including URLs for the web pages that are associated with the trusted web sites and URLs for the web pages that are associated with the fraudulent web sites using a URL verification client at the computing equipment;

transmitting the URLs from the URL verification client to a URL verification server over a communications network, wherein the URLs that are transmitted include the URLs for the web pages that are associated with the trusted web sites and the URLs for the web pages that are associated with the fraudulent web sites;

at the URL verification server, obtaining a plurality of proposed brands each of which is associated with a respective one of the URLs, wherein each of the URLs includes a second level domain and wherein the proposed brands for the URLs for the web pages associated with the fraudulent web sites do not include any of the second level domains; and at the URL verification server, evaluating the URLs for the web pages of unknown authenticity including the web pages that are associated with the trusted web sites and the web pages that are associated with the fraudulent web sites using the proposed brands and the URLs to determine for each URL whether the proposed brand is legitimately associated with that URL.

2. The method defined in claim 1 further comprising using a whitelist at the URL verification server in evaluating the URLs to determine for each URL whether the proposed brand is legitimately associated with that URL.

3. The method defined in claim 1 further comprising using a blacklist at the URL verification server in evaluating the URLs to determine for each URL whether the proposed brand is legitimately associated with that URL.

4. The method defined in claim 1 wherein the URL verification server determines whether the URLs for at least some of the web pages that are associated with the fraudulent websites are suspicious because the URLs contain an @ form indirection.

5. The method defined in claim 1 further comprising consulting a cache at the URL verification server to determine whether the URLs are trusted.

6. The method defined in claim 1 wherein evaluating the URLs comprises:

using the second level domains to submit queries from the URL verification server to a search engine to determine how many links exist to each second level domain.

7. The method defined in claim 1 wherein evaluating the URLs comprises:

sending queries from the URL verification server to a search engine to determine how many web pages in the world wide web contain the proposed brands.

8. The method defined in claim 1 wherein evaluating the URLs comprises:

for each web page, sending a query from the URL verification server to a search engine to obtain a given ranked list of second level domains having web pages that contain the proposed brand that is associated with that web page; and for each web page, determining the rank of the second level domain of the URL associated with that web page within the given ranked list.

9. The method defined in claim 1 wherein obtaining the proposed brands comprises:

at the URL verification server, extracting the proposed brands from the URLs transmitted from the URL verification client to the URL verification server.

10. The method defined in claim 1 wherein evaluating the URLs comprises:
for each web page, using the URL verification server to obtain a number of links count from a search engine over the internet that is representative of how many web links exist to the second level domain of the URL associated with that web page; and
for each web page, using the URL verification server to obtain a hit count from the search engine that is representative of how many web pages on the world wide web contain the proposed brand that is associated with that web page.

11. The method defined in claim 1 wherein evaluating the URLs comprises:
for each web page, obtaining a number of links count representative of how many web links exist to the second level domain of the URL associated with that web page;
for each web page, obtaining a hit count representative of how many web pages on the world wide web contain the proposed brand that is associated with that web page; and
for each web page, obtaining a rank representative of how the second level domain from the URL associated with that web page ranks in a ranked list of second level domains, wherein the second level domains in the ranked list are ranked according to how many web pages the second level domains have that include the proposed brand that is associated with that web page.

12. The method defined in claim 1 wherein each of the URLs comprises a top level domain and wherein evaluating the URLs comprises using the URL verification server to determine whether the top level domains are valid.

13. The method defined in claim 1 wherein obtaining the proposed brands at the URL verification server comprises obtaining at least one user-supplied brand from the URL verification client over the internet.

14. The method defined in claim 1 further comprising:
using the URL verification client at the computing equipment to extract the proposed brands from the obtained URLs;
transmitting the extracted proposed brands to the URL verification server over the internet.

15. The method defined in claim 1 further comprising:
using the URL verification server to transmit results of the evaluation of the URLs to the URL verification client over the internet; and
at the URL verification client, displaying information for the user that informs the user of the results.

16. The method defined in claim 1 further comprising:
for the URLs for the web pages that are associated with the trusted web sites, using the URL verification server to notify the URL verification client that the URLs are trusted;
using the URL verification server to extract the proposed brands from the URL;
using the URL verification server to transmit the extracted proposed brands to the URL verification client over the internet; and
when the URL verification server notifies the URL verification client that the URLs for the web pages that are associated with the trusted web sites are trusted, using the URL verification client to display messages for the user informing the user that the URLs are associated with the extracted proposed brands.

17. A computer-implemented method for determining whether or not certain web page universal resource locators (URLs) are associated with trusted or fraudulent web sites, wherein a user browses to a plurality of web pages on the world wide web of unknown authenticity using computing equipment, wherein at least some of the web pages to which the user browses are associated with trusted web sites, and wherein at least some of the web pages to which the user browses are associated with fraudulent web sites, the method comprising:
as the user browses the world wide web using the computing equipment, obtaining user-supplied brands from the user and capturing URLs for web pages of unknown authenticity including user-supplied brands and URLs for the web pages that are associated with the trusted web sites and user-supplied brands and URLs for the web pages that are associated with the fraudulent web sites using a URL verification client at the computing equipment of the user;
transmitting the captured URLs and the user-supplied brands from the URL verification client to a URL verification server over the internet, wherein the URLs and the user-supplied brands that are transmitted include the user-supplied brands and the URLs for the web pages that are associated with the trusted web sites and the user-supplied brands and the URLs for the web pages that are associated with the fraudulent web sites;
at the URL verification server, receiving the transmitted URLs and the user-supplied brands from the URL verification client;
at the URL verification server, using an actively-maintained whitelist to evaluate the URLs to determine whether the URLs are trusted, wherein each of the URLs includes a second level domain and wherein the user-supplied brands for the web pages that are associated with the fraudulent web sites do not include any of the second level domains;
transmitting results of the URL evaluation performed at the URL verification server from the URL verification server to the URL verification client over the internet; and
at the URL verification client, displaying messages for the user in response to the results transmitted from the URL verification server.

18. The computer-implemented method defined in claim 17 further comprising:
at the URL verification server, using the user-supplied brands when evaluating the URLs using the actively-maintained whitelist to determine whether the URLs are trusted.

19. The computer-implemented method defined in claim 17 further comprising:
at the URL verification server, using the user-supplied brands to submit queries to a search engine over the internet; and
at the URL verification server, using results from the search engine in response to the queries in evaluating the URLs to determine whether the URLs are trusted.

* * * * *